(12) United States Patent  (10) Patent No.: US 8,393,535 B1
Yee  (45) Date of Patent: Mar. 12, 2013

(54) ID THEFT-REDUCING DEVICE TO VIRTUALIZE ID/TRANSACTION CARDS

(76) Inventor: Joan Yee, Los Angeles, CA (US)

( * ) Notice: Subject to any disclaimer, the term of this patent is extended or adjusted under 35 U.S.C. 154(b) by 655 days.

(21) Appl. No.: 12/386,713

(22) Filed: Apr. 22, 2009

Related U.S. Application Data

(60) Provisional application No. 61/125,590, filed on Apr. 24, 2008.

(51) Int. Cl.
*G06K 5/00* (2006.01)
(52) U.S. Cl. .................................................. 235/380
(58) Field of Classification Search .................. 235/379, 235/380
See application file for complete search history.

(56) References Cited

U.S. PATENT DOCUMENTS

| | | | |
|---|---|---|---|
| 4,701,601 A | 10/1987 | Francini et al. | |
| 5,221,838 A | 6/1993 | Gutman et al. | |
| 5,276,311 A | 1/1994 | Hennige | |
| 5,530,232 A | 6/1996 | Taylor | |
| 5,748,737 A | 5/1998 | Daggar | |
| 6,293,462 B1 | 9/2001 | Gangi | |
| 6,315,195 B1 * | 11/2001 | Ramachandran | 235/380 |
| 6,494,367 B1 | 12/2002 | Zacharias | |
| 6,715,679 B1 | 4/2004 | Infosino | |
| 6,991,155 B2 | 1/2006 | Burchette, Jr. | |
| 7,044,368 B1 | 5/2006 | Barron | |
| 7,083,087 B1 | 8/2006 | Gangi | |
| 7,140,550 B2 | 11/2006 | Ramachandran | |
| 7,182,254 B2 | 2/2007 | Changryeol | |
| 7,191,952 B2 | 3/2007 | Blossom | |
| 7,213,749 B2 | 5/2007 | Webb et al. | |
| 7,472,829 B2 | 1/2009 | Brown | |
| 7,503,504 B2 | 3/2009 | Mitra | |
| 2002/0195487 A1 | 12/2002 | Hosogoe | |
| 2006/0186209 A1 | 8/2006 | Narendra et al. | |
| 2007/0131759 A1 | 6/2007 | Cox et al. | |
| 2007/0175983 A1 | 8/2007 | Klug | |
| 2007/0235524 A1 | 10/2007 | Little | |
| 2007/0257107 A1 | 11/2007 | Madani | |
| 2008/0017721 A1 | 1/2008 | Zehnacker | |
| 2008/0048022 A1 | 2/2008 | Vawter | |
| 2008/0067240 A1 | 3/2008 | Nakano et al. | |
| 2008/0073426 A1 | 3/2008 | Koh et al. | |
| 2008/0078831 A1 | 4/2008 | Johnson et al. | |
| 2008/0116258 A1 | 5/2008 | Kane | |
| 2008/0217398 A1 | 9/2008 | Woo | |
| 2008/0217399 A1 | 9/2008 | Leblanc | |
| 2008/0217400 A1 | 9/2008 | Portano | |
| 2008/0222720 A1 | 9/2008 | Sines | |
| 2008/0302869 A1 | 12/2008 | Mullen | |
| 2008/0314976 A1 | 12/2008 | Capurso et al. | |
| 2009/0008445 A1 | 1/2009 | Chen et al. | |

* cited by examiner

*Primary Examiner* — Jamara Franklin (57) ABSTRACT

One embodiment of a device to virtualize a multitude of identification and transaction cards comprises a programmable card, approximately the size of a standard banking card, slidably detachable from a control unit that programs the programmable card. The device includes a microcontroller (26) and user interface to enable a user to access and manipulate data and graphics from the identification and transaction cards. The customized data and graphics can be transferred to the programmable card via a write/read head in a hinged magnetic stripe programmer slot (17) that activates when adjusted to a vertical position. The programmable card communicates compatibly with various transaction readers, including those for magnetic stripe, bar code, and RFID. The device includes security features, including a biosensor (12) to authorize activation of the device, and a visible, audible, and palpable alert to warn in real time of unauthorized use of data stored in the device.

18 Claims, 9 Drawing Sheets

Computer with Internet access
via connector port 19
▼
Card issuer website
- Associations
- Financials
- Insurers, etc.

Transaction terminal via data
stripe 27 or RF interface 18
▼
User-customized data
- Membership/rewards
- Stored value
- Promotions, etc.

▶ Virtual card creation ◀
- Username
- Filename
- Data
- Graphics

▼
Control unit
▼
Virtual card manipulation via
touchpad 15 and touch screen 16
- Add
- Edit
- Delete
- Combine
- Separate
- Re-size
- Re-position
- Orbit Card issuer website
- Disposable numbers
- Price out
- Transaction history
- Account management ▼
◀ Programmable card ▶
- Screen 14
- Data stripe 27
- RF interface 18
- Wireless Merchant transaction card
reader
- Access
- Purchase
- Account management ▶ Control unit ◀
▼
File update

FIG. 9

ID THEFT-REDUCING DEVICE TO VIRTUALIZE ID/TRANSACTION CARDS

CROSS REFERENCE TO RELATED APPLICATIONS

This application claims the benefit of provisional patent application No. 61/125,590, filed Apr. 24, 2008 by the present inventor, which is incorporated by reference.

FEDERALLY SPONSORED RESEARCH

Not applicable

SEQUENCE LISTING OR PROGRAM

Not applicable

BACKGROUND OF THE INVENTION

1. Field of Invention

The embodiments relate generally to identification and transaction cards, specifically to a device for virtualizing such cards and the security of using that device.

2. Prior Art

Most people carry at least twenty cards in their wallets, many of them containing private information that would be valuable to an identity thief. These include driver's licenses, credit/debit cards, gift cards, membership/rewards cards, library cards, health/car insurance cards, ATM cards, and business cards. The quantity increases every year, which creates concerns about the inconvenience of carrying so many cards and the risk of identity theft if a wallet is lost or stolen. Furthermore, to reduce energy consumption and help the environment, one desires a device that reduces the need to produce so much plastic.

Attempts to consolidate cards into one secure device have yet to yield a universal, practical solution. Some of the limitations in the prior art stem from static thinking. For instance, some assume that a "card" is the desired end product, instead of seeing it as just a convenient vehicle on which to carry information. U.S. Pat. No. 5,276,311 to Hennige (1994) and U.S. Pat. No. 6,315,395 to Ramachandran (2001) reflects this conventional approach. Not only is a card not inherently necessary, but its elements (data, graphics, interface) can be re-arranged, combined, sized, and accessed in any number of ways, free from any physical limitation. Hennige and Ramachandran also assumes that a signature is a desired feature, instead of seeing it as just the available method of authentication that gained acceptance before better measures emerged. Other devices assume that a check is a prevailing method of payment, rather than a method that is giving way to newer technologies. U.S. Pat. No. 5,748,737 to Daggar (1998) describes a device without a graphics display. Most inconveniently, some prior art assumes that its devices exist in the vacuum of a particular transaction, rather than as a critical resource that one would use under all sorts of life circumstances. For instance, U.S. Pat. No. 6,991,155 B2 to Burchette, Jr. (2006) discloses a transaction card device that automatically generates a one-time security code to associate with a card account and transaction, to be transmitted to a remote computer via a card reader. This system does not take into consideration that one sometimes uses a credit card over the telephone, without a card reader to transmit the code.

Some improvements have been modest, limited to a single feature, or a single card. U.S. patent application Ser. No. 11/713,759 to Woo (2007), for instance, only describes adding a digitized fingerprint system to individual magnetic stripe cards. U.S. patent application Ser. No. 11/552,651 to Kane (2006) only discusses a combination of a membership card with a payment card. U.S. Pat. No. 5,530,232 to Taylor (1996) and U.S. Pat. No. 7,191,952 B2 to Blossom (2007) disclose smart cards with limited storage and functions.

Devices with multiple applications and features have remained too cumbersome to fit in a typical wallet, making them inconvenient to carry. See U.S. Pat. No. 5,221,838 to Gutman (1993) and U.S. Pat. No. 6,293,462 B1 to Gangi (2001) for examples. Other prior art has been complicated or tedious to operate, requiring a user to perform many steps on an unwieldy apparatus and to input changing codes. Instead of using the apparatus described by U.S. Pat. No. 6,315,195 to Ramachandran (2001) and U.S. Pat. No. 7,140,550 B2 to Ramachandran (2006), for instance, it may be faster and easier to pull an existing plastic card out of one's wallet.

Some devices are limited in how they transfer information. Some only use a magnetic stripe. Others only use near-field communication. For instance, U.S. Pat. No. 7,044,468 B1 to Barron (2006) discloses a system that requires merchants to adopt entirely new bar code readers. Some prior art limits its ability to adapt to existing card readers. U.S. patent application Ser. No. 11/456,906 to Cox et al. (2006), U.S. patent application Ser. No. 11/782,526 to Zehnacker (2007), and U.S. Pat. No. 7,503,504 to Mitra (2009) show cards which are too thick to slide into transaction terminals that require a card to be entirely inserted into a slot. These devices also operate as one unit, rather than as a main unit storing all data and a detachable part that temporarily carries the data of one selected card. Therefore, all of one's identification/financial data may be at risk when one entrusts the device to someone else. It would be like giving a waiter one's entire wallet rather than a single credit card.

In attempting to offer greater convenience, some prior art has incorporated the ability to store and transmit identification/financial information with a mobile electronic device such as a cell phone, PDA, or music player. U.S. patent application Ser. No. 11/537,347 to Johnson et al. (2006), U.S. patent application Ser. No. 11/714,800 to Leblanc (2007), and U.S. patent application Ser. No. 12/167,576 to Chen et al. (2008) combine mobile phones with financial transactions. This innovation may actually put one's personal identification/financial information at greater risk. While wallets tend to be protected and carried in a pocket or a purse, cell phones, PDAs, and music players tend to be handled more casually. They are borrowed, put down in public places, lost more frequently, and made more vulnerable to theft. Information need not be stolen in order for privacy to be breached; it just needs to be read. It may be practical to carry small cash amounts in these mobile devices, but risky to include all one's identification/financial data. Additionally, wireless transmissions can be recorded and surveilled, and they inevitably involve third parties, which increase the risk of fraud. U.S. patent application Ser. No. 11/534,653 to Koh et al. (2006) and U.S. patent application Ser. No. 11/466,544 to Vawter (2006) describe such systems that use cell phones and third party computers.

Most notably, some prior art may actually increase the risk of identity theft by requiring the involvement of third parties, the use of unsecure internet communication, and the storage of identification/financial data on remote servers that can be hacked. Systems described in U.S. patent application Ser. No. 09/949,874 to Hosogoe (2001), U.S. Pat. No. 6,494,367 B1 to Zacharias (2002), U.S. Pat. No. 6,715,679 B1 to Infosino (2004), U.S. patent application Ser. No. 11/279,294 to Little (2006), and U.S. Pat. No. 7,182,254 B2 to Changryeol (2007)

all require the user to transfer identification/financial information to a database separate from the card issuer. Regardless of how securely encrypted a computer system claims to be, the developer of any application, or anyone else who understands the system, can retrieve or decrypt any of the data in the system. It's unlikely that a programmer can design a computer system to automatically decrypt data for the user, while making it impossible for that programmer to reconstruct the same process to retrieve the data manually. Also, data must be decrypted to be usable on the interne. Therefore there must be a system behind it that can decrypt it. If any person has access to this system, that person also has the ability to access the data.

Accordingly, a need remains for a device to solve the issues mentioned above, to unconventionally manage ID/transaction cards and reduce fraud.

SUMMARY

In accordance with one embodiment, an ID/transaction device virtualizes physical identification and transaction cards, allowing the user to manipulate and transfer selected data and images to a programmable card, which communicates compatibly with various transaction readers. To enhance privacy and security, the device enables the user to mask his/her identity and account information, restrict access, and store private data locally rather than in third-party computers. Functioning under various conditions, the device remains flexible, legible, durable, and convenient, informing the user of transactions in real time.

DRAWINGS

Figures

These drawings refer to embodiments of the ID/transaction device.

REFERENCE NUMERALS

| | |
|---|---|
| 11 | clip |
| 12 | fingerprint biosensor |
| 13 | electrical contacts |
| 14 | screen |
| 15 | touchpad |
| 16 | touch screen |
| 17 | magnetic stripe programmer slot |
| 18 | RF interface with active transponder |
| 19 | connector port |
| 20 | supercapacitor |

-continued

| | |
|---|---|
| 21 | pressure switch |
| 22 | RAM |
| 23 | μcontroller |
| 24 | card electrical contacts |
| 25 | battery/port |
| 26 | microcontroller |
| 27 | data stripe |
| 28 | status screen with ambient light sensor |

DETAILED DESCRIPTION

Figure 1:
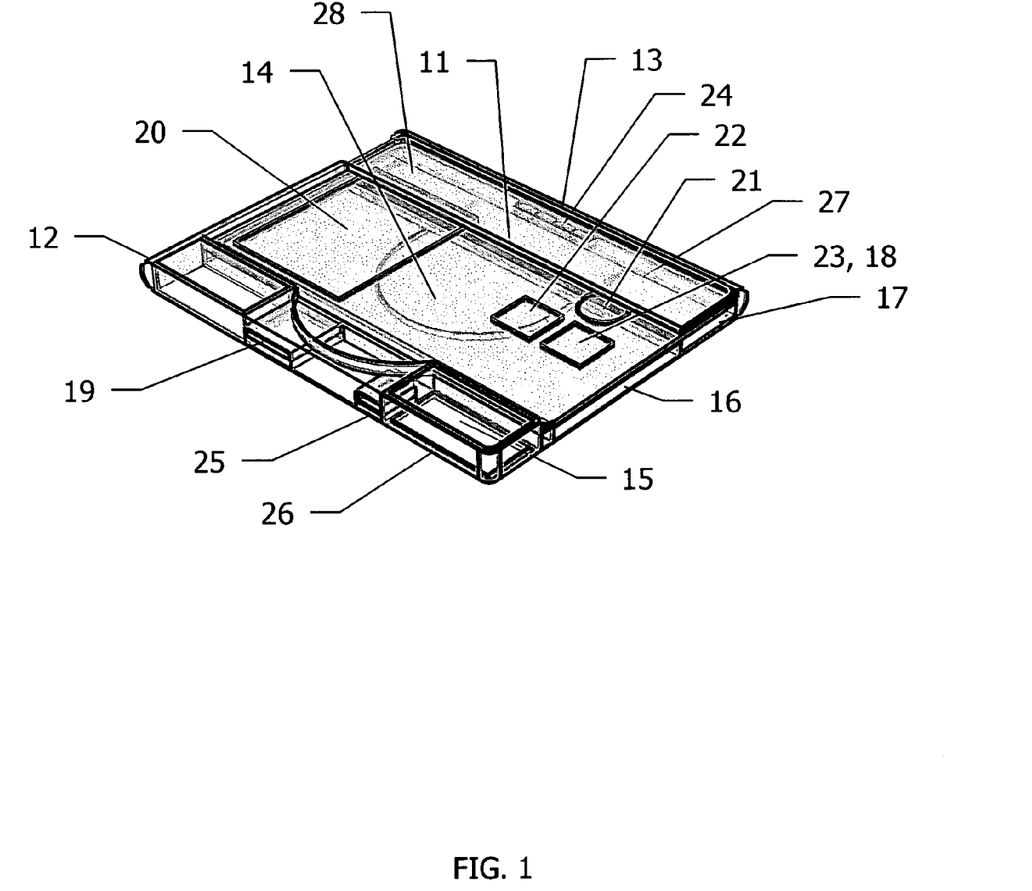
FIG. 1 shows an x-ray perspective view of the closed device.

FIG. 1 shows an x-ray perspective view of a first embodiment of the ID/transaction device. The device comprises a physically durable control unit, as detailed in FIG. 2, which holds, protects, and programs a flexible, water-resistant programmable card, as detailed in FIG. 3 and FIG. 4. The programmable card resembles a typical credit card, and the control unit is slightly larger, approximately 89 mm (3.5")×70 mm (2.75")×6 mm (0.25"). A separate docking station is not shown.

Figure 2:
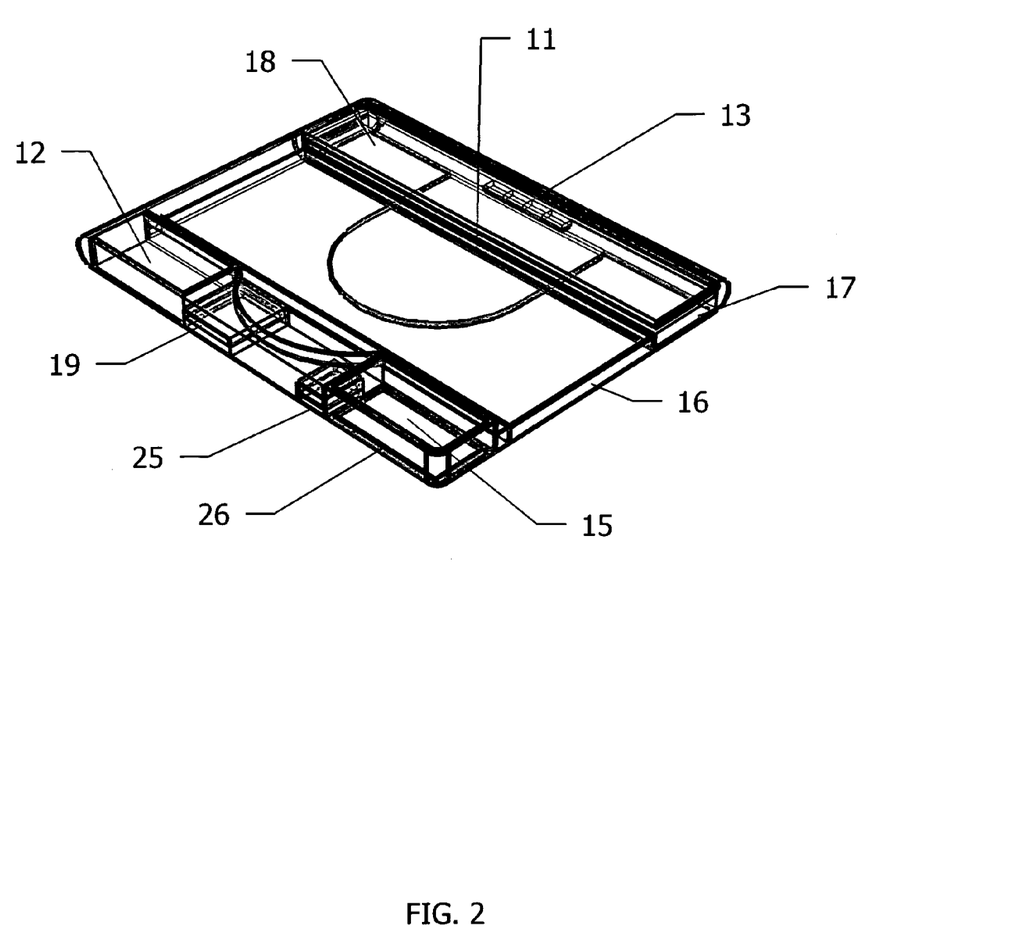
FIG. 2 shows an x-ray perspective view of a control unit.

As shown in FIG. 2, the control unit comprises a microcontroller 26, which includes a processor, integrated memory, input/output, timer, and language/currency converter program. The microcontroller 26 is operatively connected to: a fingerprint biosensor 12 for authentication/activation; a color touch screen 16 for manipulating display; a touchpad 15 for user interface; a battery/port 25 for recharging; a connector port 19 for hardware connection; electrical contacts 13 for interfacing with the programmable card; a hinged magnetic stripe programmer slot 17 with a write/read head for transferring data; and a color status screen with ambient light sensor 28 on the front face of the programmer slot 17. A clip 11 is attached to the back of the control unit.

Figure 3:
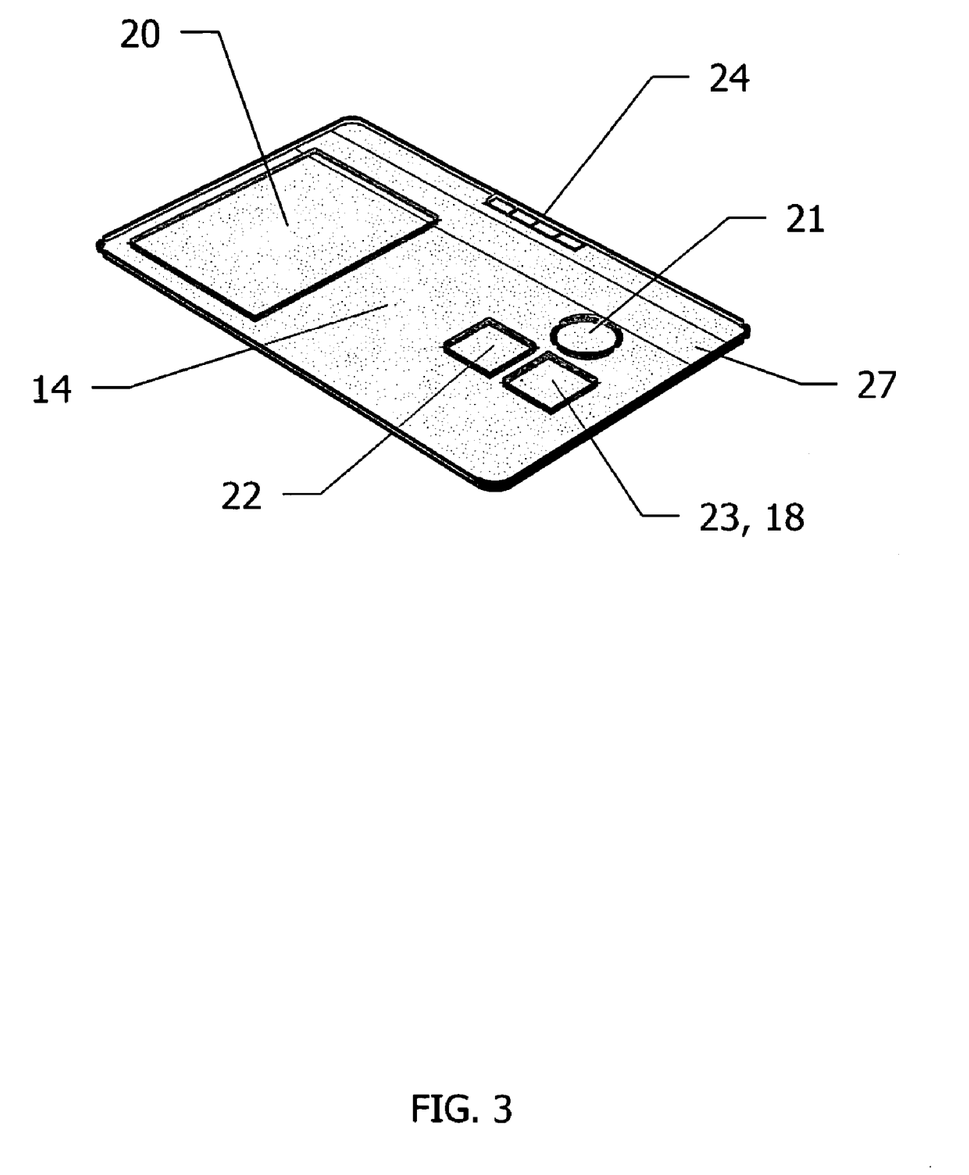
FIG. 3 shows an x-ray perspective view of the front of a programmable card.
Figure 4:
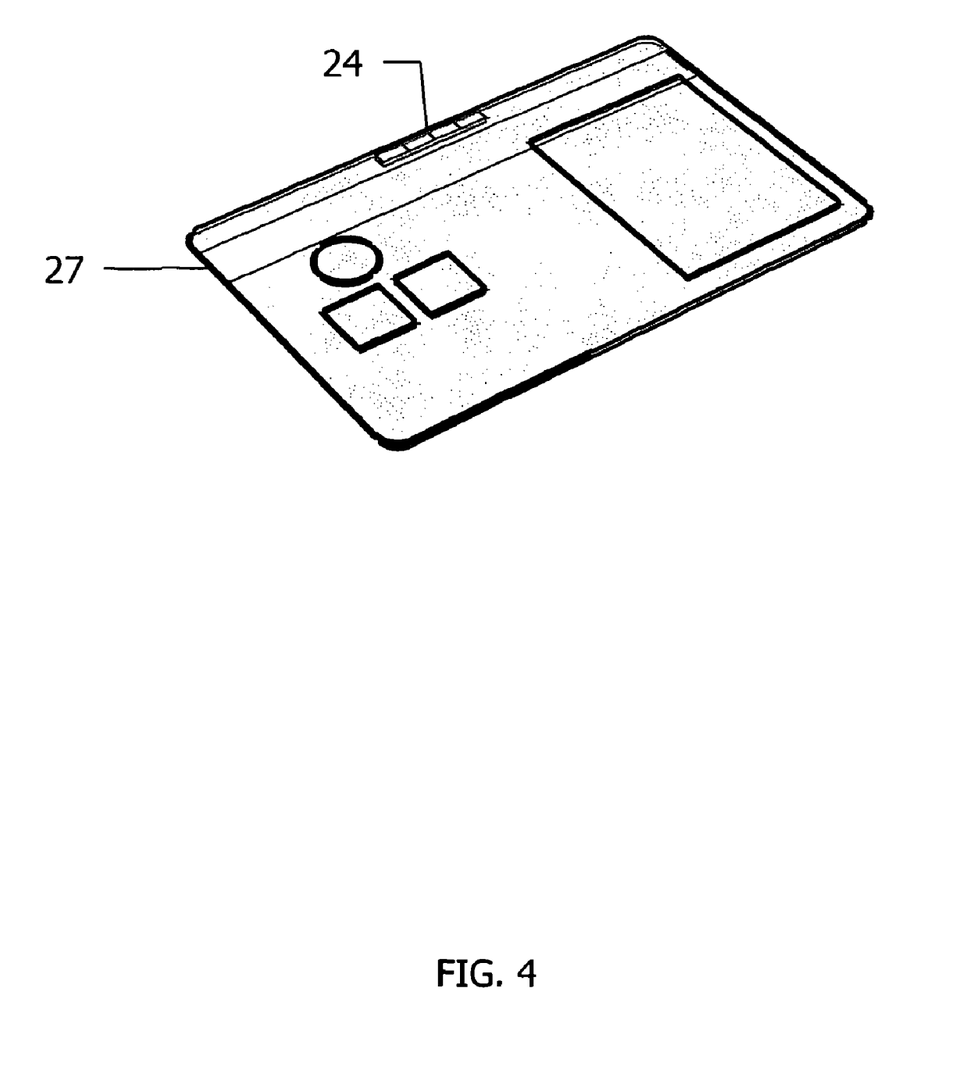
FIG. 4 shows an x-ray perspective view of the back of the programmable card.

As shown in FIG. 3, the front of the programmable card comprises a flexible "electronic paper" color screen 14, under which is embedded a μcontroller 23 including RF interface with active transponder 18, operatively connected to: a flat (<1 mm thick) supercapacitor 20 for energy storage; a pressure switch 21 to activate/deactivate the card; and static RAM 22 for memory. As shown in FIG. 4, the back of the programmable card comprises card electrical contacts 24 for interfacing with the electrical contacts 13 of the control unit, and a magnetic data stripe 27 for programming.

Figure 5:
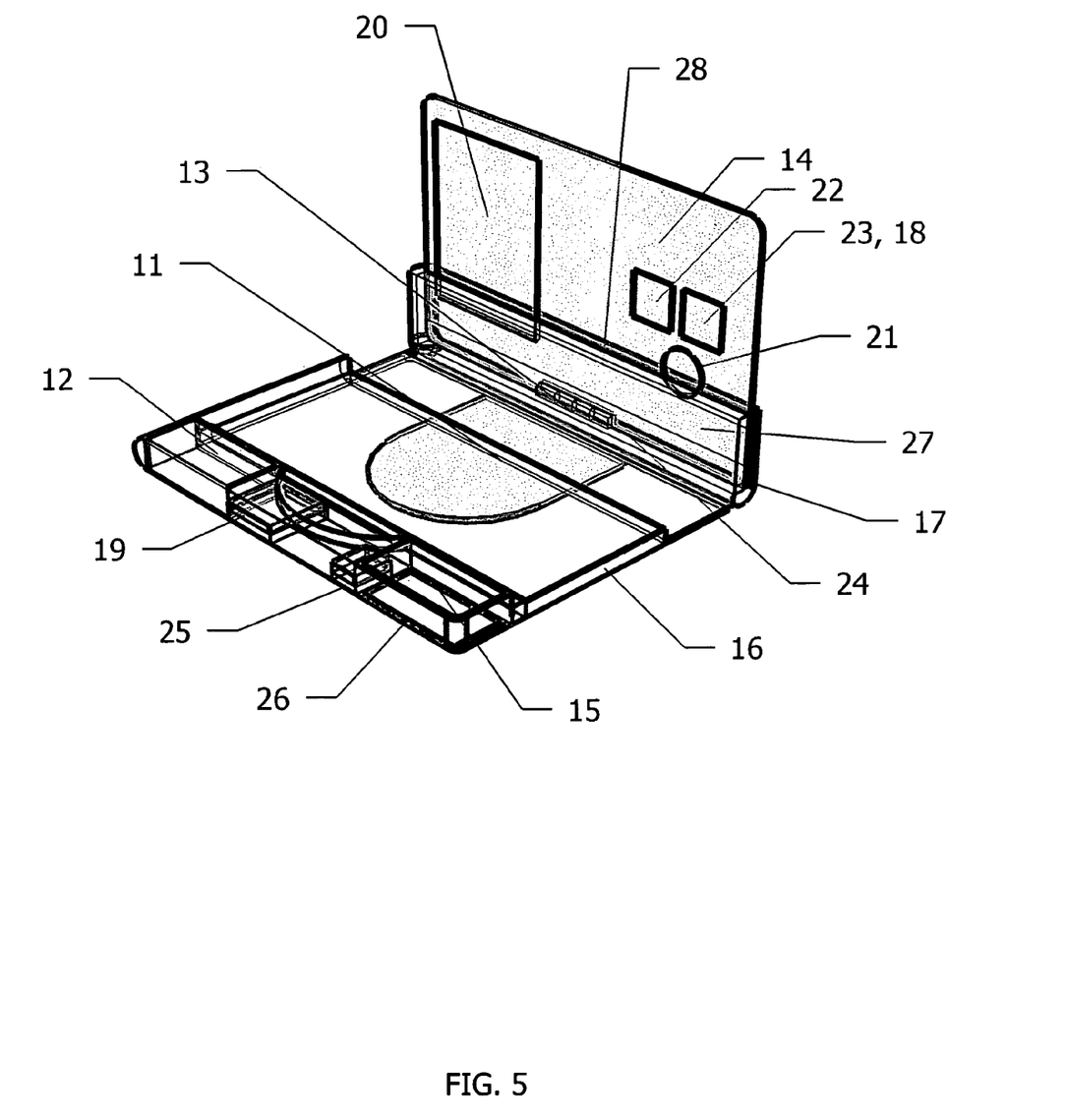
FIG. 5 shows an x-ray perspective view of the opened device.

When the device is in a closed position, as shown in FIG. 1, the top 30 percent of the programmable card is held in the programmer slot 17. The rest of the card rests over the touch screen 16, acting as a cover for the device. The bottom edge of the card aligns with a rectangular platform that acts as an offset to hold the card in place. The platform contains the biosensor 12, the connector port 19, the battery/port 25, and the touchpad 15 over the microcontroller 26, all aligned respectively from left to right along the bottom edge of the device. The ports 19, 25 require less depth than the biosensor 12 and the touchpad 15, allowing the platform to be demi-depressed at its center. This depression is concave to allow the user to access the programmable card with his/her finger and hinge up the programmer slot 17 with the programmable card as shown in FIG. 5. When the programmable card is positioned in the programmer slot 17, the card electrical contacts 24 connect with the electrical contacts 13 of the control unit. The left and top edges of the device are rounded to conform smoothly to the fold of wallets of billfold and checkbook design.

Appropriate system software and application programs are associated with the above functions. Those skilled in the art can readily understand how such a device could be built, programmed, and operated.

Operation

The user sets up a self-contained transferring system by entering identification and security information into both the control unit and the separate docking station (not shown). This information includes a biometric of a designated fingerprint of the authorized user. The user then transfers and stores data from physical ID/transaction cards into the control unit via the docking station, which can scan visual images, including bar codes, read magnetic stripes and RFID chips, store the data in a digital and encrypted form, connect to a computer, and recharge the device through battery/port 25.

Figure 8:
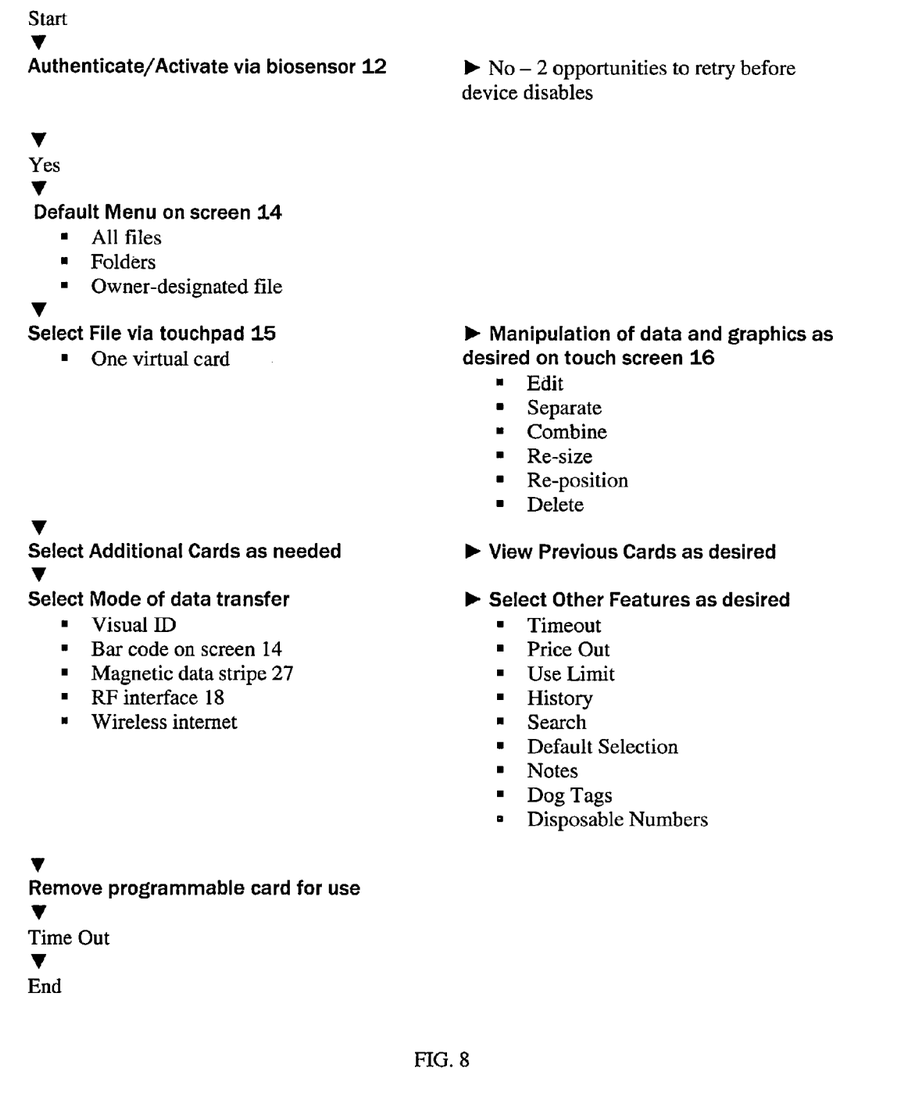
FIG. 8 shows an operational flowchart for the device.

FIG. 8 shows the below-described process in an operational flowchart.

Typically, in this embodiment, the closed device as shown in FIG. 1 can be carried inside a wallet, secured to a card slot via the attached clip 11. To turn on the device, the user places his/her designated finger on biosensor 12. The device does not activate unless the fingerprint biometric matches the security information stored during the set-up process using the docking station. Since activation and authentication are combined, the device eliminates one step from the process of some prior art. After three failed attempts to authenticate the user, the device "dies" until it can be reactivated via the docking station.

Icons appear on status screen 28 to indicate the status of the device. The four indicators, accompanied by appropriate audible and palpable alerts, are: Hibernating, Active, Denying Access, and Dead.

Once the device is activated, a menu appears on screen 14. Communicating with status screen with ambient light sensor 28, microcontroller 26 automatically adjusts all screens 14, 16, 28 for optimum legibility. Screens 14, 16, 28 can also be manually adjusted, via touchpad 15, for circumstances ranging from dim environments to bright sunlight. The menu contains the data files of all the cards that have been stored in the device. The files can be identified by their real card names or by user-designated filenames for privacy. Employing touchpad 15 the user controls how the menu appears: in different arrangements, as a list, or as icons. The files can also be put into folders, so that, for example, all the gift cards are organized together, or all files relating to a particular organization, merchant, or purpose are organized together.

The user selects the desired card data file with touchpad 15, and a full-color image of that card appears on screen 14. Approximately the top 30 percent of the image also appears on status screen 28, thus showing the part of the image that is hidden by programmer slot 17. Together, the images from screen 14 and status screen 28 appear to form one whole virtual card, as shown in FIG. 1. The user can employ touchpad 15 to orbit the image to see all facets of the card. By hinging up the programmable card, as shown in FIG. 5, and employing touch screen 16, the user can also separate the alphanumeric data from the graphic images, change the position and size of the data and the graphics, combine them with other data and graphics, and otherwise organize and manipulate the information to form a customized virtual card. For instance, data from medical, dental, and prescription cards can be combined into one virtual "health" card. This ability to manipulate information breaks from the conventional assumption that cards need to remain separate, physical entities.

Figure 7:
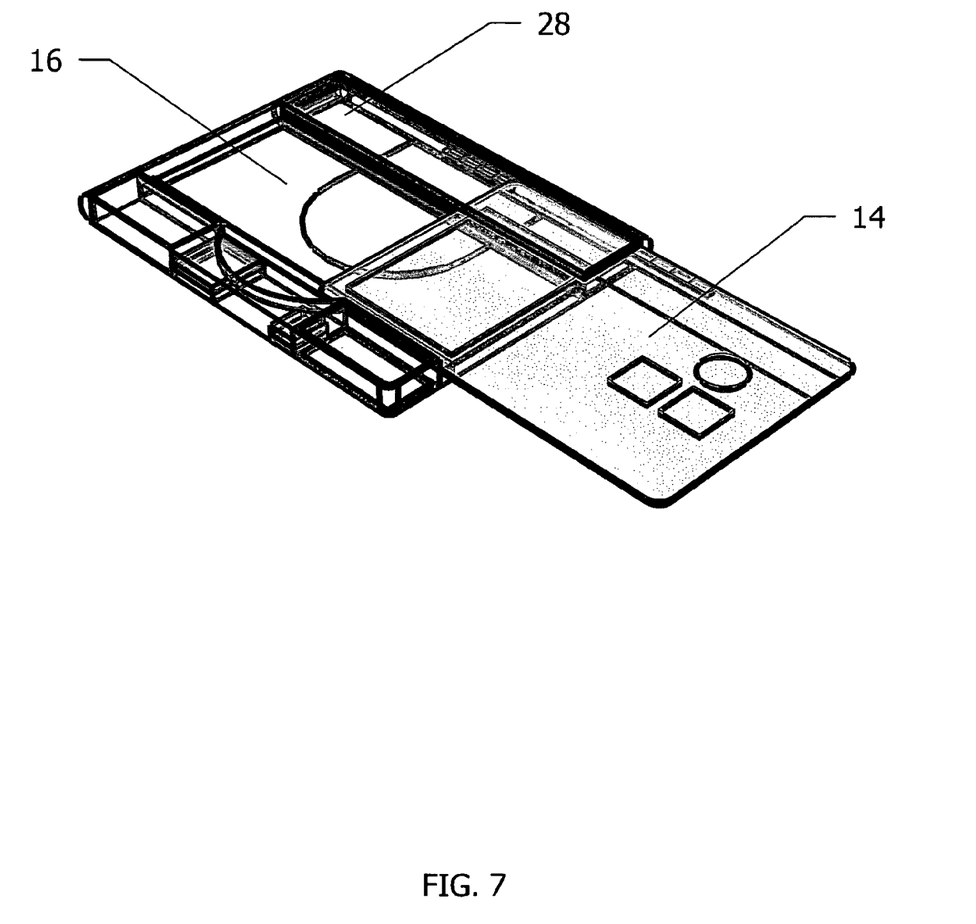
FIG. 7 shows an x-ray perspective view of the device's screens in use.

In a situation where more than one card image needs to be shown at once, one image can be displayed on touch screen 16 and the other on screen 14, as shown in FIG. 7. By employing touchpad 15, the user can see "previous" files displayed during the current session or return to the menu. If the visual information is all that is needed, the user simply slides the programmable card out of the control unit as shown in FIG. 7.

Figure 6:
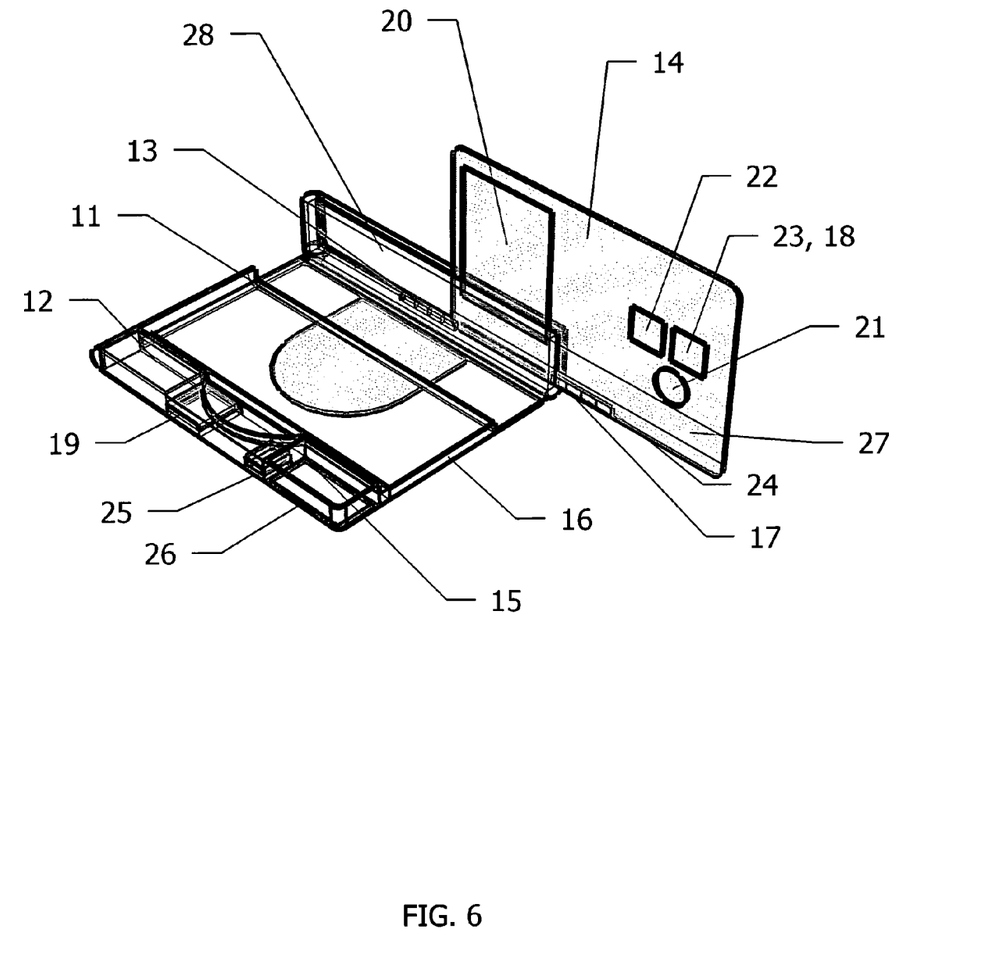
FIG. 6 shows an x-ray perspective view of the programmable card during swiping.

If the data file includes a bar code, a bar code reader can scan the code directly off screen 14. If data transfer via magnetic stripe is desired, data stripe 27 can be programmed via the hinged programmer slot 17. The write/read head in programmer slot 17 activates when slot 17 is adjusted to a vertical position, as shown in FIG. 5. Programmer slot 17 transfers data when the user swipes the programmable card through it, as shown in FIG. 6. The user can then swipe the programmable card through existing magnetic stripe transaction card readers in place of the original card. Unlike some prior art, the programmable card has approximately the same dimensions of a standard banking card. It can therefore be used in transaction terminals that require the entire card be inserted. If RFID communication is desired, that transfer can occur through μcontroller 23 and RF interface with active transponder 18. These communication options allow the device to be compatible with various current card readers and adaptable to emerging transaction systems worldwide.

Merchant transaction terminals can also transfer data onto the programmable card. For instance, if the programmable card is functioning as a particular stored-value card, a merchant can write a new cash balance onto data stripe 27 at the end of a transaction. The programmable card could then transfer that data back to the control unit via programmer slot 17, thus keeping the data file for that stored-value card up to date.

As indicated in FIG. 7, the top part of the card image remains on status screen 28 when the programmable card is removed, so the user always knows which virtual card is being employed. Alternatively, status screen 28 can show the names or icons of the data files in use.

The user can set various preferences and security features by hinging up the programmable card, as shown in FIG. 5, and using touch screen 16 and touchpad 15:

- A "Timeout" setting allows the user to determine how long the programmable card remains active. The typical default time of 30 seconds sufficiently covers most uses at a point-of-sale. After the set time, μcontroller 23 clears screen 14, and discharges supercapacitor 20, which deletes the static RAM 22 memory. The status icon changes to Hibernating.
- A "Use Limit" option sets the number of times the programmable card can be read before Hibernating. This prevents the card from being read after its intended, authorized use.
- A "History" file shows the times and dates when a data file has been loaded into the programmable card and used.
- A "Search" function allows the user to know if a particular card data file has been transferred into the device; determine which cards were used on particular dates; find the History for a particular transaction; and locate any user-designated keywords.
- A "Default Selection" determines the image that appears on screen 14 upon activation. Instead of the menu, the device can load the "Most Used", "Last Used" or any "Designated" card, so the desired card is always "on top". Regardless of the actual data file selected, screen 14 can display a custom graphic image with a user-designated username, so that the real information is hidden from a potential thief. Microcontroller 26 also includes a converter that allows the user to set a default language and currency.

A "Notes" function allows the user to enter and store information about the data files.

Typical notations include: expiration dates and restrictions, locations where a card can be used, information on how a gift card was acquired, reminders, etc. If desired, the user can allow merchants to transfer marketing information, such as promotions and discount coupons, and other user-related information during a transaction. Or the user can restrict such communication. Audible and palpable alerts can be set to correspond to the Notes, so that the user receives notices on status screen 28 at designated times. For instance, the user can be notified a selected number of days before the expiration of a credit card.

> Programmable "Dog Tags" appear on touch screen 16 with user-designated contact information if a lost device is found and opened.

Additionally, each programmable card is manufactured with a serial number in μcontroller 23, which associates it with each data file that is scanned and transferred by the docking station. The device disallows the same data file to be scanned and transferred using a programmable card with a different serial number, thus preventing multiple copies of ID/transaction cards from being made. Since the serial number is included with the programmable card, the user need not remember or input it. As an additional security measure, it is also not visible.

When a shared account has multiple cards, or a supervisor's account has subordinate cards, the card issuer differentiates the cards with different names and/or numbers. The subordinate or shared card holder can thus scan and transfer these cards into their own ID/transaction devices.

When a data file is no longer needed, the user can delete it from the menu via touchpad 15.

Figure 9:
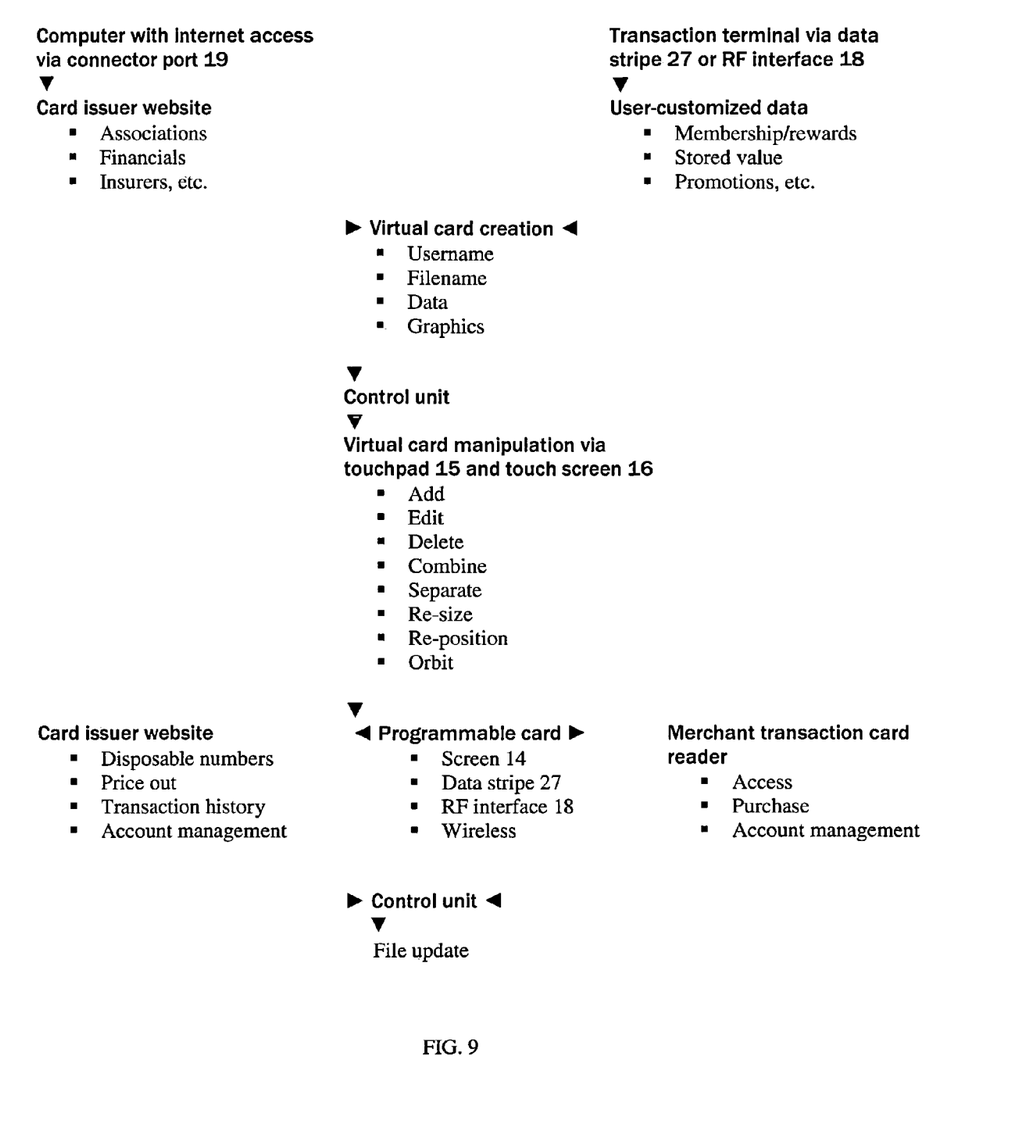
FIG. 9 shows a systemic flowchart for the device.

Optionally, direct communication with card issuers' websites and/or merchants' point-of-sale terminals can eliminate the need to issue original plastic cards. It can also eliminate the need for the docking station. FIG. 9 shows this process in a systemic flowchart.

The user can connect the device to a computer via a cable in connector port 19 and, with internet access, transfer data directly to and from card issuers' websites. The user can also create in the computer a virtual card data file with customized data and graphics before transferring that data file to the device. At point-of-sale terminals, merchants can create their own virtual membership/rewards/cash cards and transfer that data into the device through data stripe 27 or RF interface 18. This method would incentivize customers to patronize the merchant, and also allow the merchant to avoid the interchange fees incurred when their customers transact with credit cards.

Alternative Embodiments

While the first embodiment can operate locally, other ramifications ensue when an alternative embodiment includes a wireless interface to communicate to card issuers. Additional features include:

> A "Price Out" option determines the amount of money that can be charged on a credit, debit, or gift card. This setting can apply to each individual transaction or to an aggregate amount over a certain time period.
>
> The "History" file includes greater details on specific transactions. The user can retrieve this information in case he/she needs a proof of purchase or transaction. An audible and palpable alert on status screen 28 informs the user each time a new item has been added to the History file, so that the user can know when a shared or subordinate card is being employed. These real-time notices allow the user to determine immediately whether unauthorized activity has occurred.
>
> "Disposable Numbers", good for one-time use only, can be assigned to credit and debit card data files, which would be especially protective when entrusting the programmable card to a stranger.

In a further embodiment, the manufacturer of the device maintains its own security website. Additional features for users registered at the website include:

> An initial set-up stores user information and the serial number of the device in a secure, encrypted form.
>
> In case of loss or theft, a GPS receiver can be engaged to identify the device's location, based on user information, the registered serial number, and the active transponder coupled with microcontroller 26.
>
> An "Unauthorized User Identification" on biosensor 12 can record and transmit to the security website a fingerprint biometric of an unauthorized user upon the third failed attempt to activate the device.

Advantages

As described above, some embodiments of the ID/transaction device offer evident advantages. By allowing the user to add to, edit, combine, separate, re-size, re-position, organize, orbit, and otherwise manipulate card data and graphics on at least two displays, the device virtualizes physical cards and enables the user to customize them as needed or desired. By incorporating different modes of data transfer, the device communicates compatibly with transaction readers throughout the world. It also operates in different languages and currencies.

To address security and privacy issues, personal identification/financial data can be transferred locally to a control unit, without unsecure Internet communication with a third-party computer system. The user can create usernames, custom graphics, and data filenames to mask his/her real name and account information. The user can restrict electronic marketing from merchants. Features to control activation time, price of transaction, and number of transactions provide additional security measures. Moreover, the device can offer real-time information about the status of accounts, memberships, and other related data, alerting the user audibly and palpably each time a new transaction occurs. Unauthorized activity could therefore be immediately evident.

Recognizing that the user employs the device under various conditions, its displays adjust for optimum legibility based on the ambient light. It is physically flexible, durable, and water resistant, and operates with ease. If lost or stolen, the device can be tracked and the fingerprint biometric of an unauthorized user recorded.

CONCLUSION, RAMIFICATIONS, AND SCOPE

While the above description contains many specific features, they do not limit the scope of any embodiments, but merely exemplify the presently preferred embodiments. Those skilled in the art can readily understand that modifying microcontrollers, displays, memory, power sources, authentication sensors, user interface, communications interface, programming, and any other aspect of the technology and engineering can have ramifications, but they remain within the spirit and scope of the embodiments. For instance, a reliable magnetic stripe emulator can substitute for the magnetic stripe read/write head in programmer slot 17. In that case, programmer slot 17 would not hinge. In addition to contactless RF interface, μcontroller 23 can include contact interface. In that case, card electrical contacts 24 would be redesigned to interface also with contact card readers. Connector port 19 and battery/port 25 can be combined into one element. A Personal Identification Number (PIN) can be added as a backup security measure. In that case, a keypad would appear on touch screen 16 for the user to input the PIN.

In the physical design, different colors, shapes, materials, sizes, and arrangements can be substituted to create variations in form without departing from the spirit and scope of the embodiments.

Thus the scope of the embodiments should be determined by the appended claims and their legal equivalents, and not by the examples given.

I claim:

1. A device to virtualize a multitude of identification and transaction cards, comprising:
    (a) a programmable card approximately the size of a standard banking card, slidably detachable from
    (b) a control unit adapted to securely hold and program said programmable card, said control unit comprising:
        a microcontroller to receive, store, manipulate and manage data and graphics of said identification and transaction cards, operatively connected to
        user interface to enable access and manipulation of said data and graphics on at least two displays on said device,
        at least one data transferer to transfer the manipulated data and graphics to said programmable card, and
        a security system to authorize access to said device and alert a user to unauthorized use of the data stored in said device,
    whereby said user can communicate the custom virtualized data and graphics from said device to a variety of card readers.

2. The device of claim 1 wherein said at least one data transferer comprises a write/read head in a hinged magnetic stripe programmer slot that activates when said slot is adjusted to a vertical position.

3. The device of claim 1 wherein said user interface comprises two displays on said control unit and one display on said programmable card, such that selected data and graphics of more than one virtualized card can be viewed and manipulated at the same time.

4. The device of claim 1 wherein said user interface includes an ambient light sensor that enables said microcontroller to adjust automatically said at least two displays for legibility.

5. The device of claim 1 wherein said user interface comprises a touch screen and a touchpad to allow said user to add to, edit, delete, combine, separate, re-size, re-position, organize, and orbit and otherwise manipulate the virtualized data and graphics and to generate custom usernames and graphics.

6. The device of claim 1 wherein said security system to alert said user to unauthorized use comprises on one said display a visual indicator accompanied by audible and palpable indicia.

7. The device of claim 1 wherein said security system further comprises an active transponder to identify the location of said device.

8. The device of claim 1 wherein said microcontroller includes a converter to translate language and currency.

9. A method of virtualizing a multitude of identification and transaction cards, comprising:
    (a) providing a device comprising a programmable card, approximately the size of a standard banking card, slidably detachable from a control unit adapted to securely hold and program said programmable card,
    (b) requiring a user to activate said device through security means that authenticates identity and authorizes access to said device,
    (c) receiving, storing, manipulating and managing data and graphics of said identification and transaction cards in said control unit through microcontrolling means operatively connected to user interface,
    (d) accessing and manipulating through said user interface said data and graphics on at least two displays on said device,
    (e) transferring the manipulated data and graphics through at least one transfer means from said control unit to said programmable card, and
    (f) providing an indicator via said security means to alert said user of unauthorized use of the data stored in said device,
    whereby said user can communicate the custom virtualized data and graphics from said device to a variety of card readers.

10. The method of claim 9 wherein said at least one transfer means comprises a write/read head in a hinged magnetic stripe programmer slot that activates when said slot is adjusted to a vertical position.

11. The method of claim 9 wherein said user interface comprises two displays on said control unit and one display on said programmable card, such that selected data and graphics of more than one virtualized card can be viewed and manipulated at the same time.

12. The method of 9 wherein said user interface includes an ambient light sensor that enables said microcontroller to adjust automatically said at least two displays for legibility.

13. The method of claim 9 wherein said user interface comprises a touch screen and a touchpad to allow said user to add to, edit, delete, combine, separate, re-size, re-position, organize, and otherwise manipulate the virtualized data and graphics and to generate custom usernames and graphics.

14. The method of claim 9 wherein said indicator of said security means comprises a visual notice on one said display accompanied by audible and palpable indicia.

15. The method of claim 9 wherein said security means further comprises an active transponder to identify the location of said device.

16. The method of claim 9 wherein said microcontrolling means includes a converter to translate language and currency.

17. A system for virtualizing identification and transaction cards, comprising:
    (a) a device comprising a programmable card, approximately the size of a standard banking card, slidably detachable from a control unit adapted to hold and program said programmable card, said control unit comprising:

a microcontroller to receive, store, manipulate and manage data and graphics of said identification and transaction cards, operatively connected to:

user interface to enable access and manipulation of said data and graphics on at least two displays on said device, at least one transfer means to transfer the manipulated data and graphics to said programmable card, at least two communications interface to transmit data and graphics from said programmable card, and security means to authorize access to said device and alert a user to unauthorized use of the data stored within said device, (b) a computer with Internet access to connect to a multitude of card issuers' websites for downloading said data and graphics of said identification and transaction cards associated with said user, creating custom data and graphics to associate with said user, and transferring said data and graphics to said device via a cable and a connector port, (c) a merchant transaction terminal comprising programming means for generating user-associated information and communicating said information to said programmable card, whereby said user can manipulate the custom virtualized data and graphics and communicate said data and graphics from said device to a variety of card readers and websites.

18. The system of claim 17, further including a security website that comprises registering identifying information for said device and said user; engaging a GPS receiver to locate an active transponder in said device; and receiving through said security means a biometric of an unauthorized user who attempts to access said device.

\* \* \* \* \*